US012212066B2

(12) United States Patent
Shepeleva et al.

(10) Patent No.: US 12,212,066 B2
(45) Date of Patent: Jan. 28, 2025

(54) ANTENNA ARRAY WITH PARTIALLY REFLECTIVE DEPOLARIZING METASURFACE

(71) Applicant: Samsung Electronics Co., Ltd., Suwon-si (KR)

(72) Inventors: Elena Aleksandrovna Shepeleva, Moscow (RU); Artem Rudolfovich Vilenskiy, Moscow (RU); Gennadiy Alexandrovich Evtyushkin, Moscow (RU); Anton Sergeevich Lukyanov, Moscow (RU)

(73) Assignee: Samsung Electronics Co., Ltd., Suwon-si (KR)

( * ) Notice: Subject to any disclaimer, the term of this patent is extended or adjusted under 35 U.S.C. 154(b) by 74 days.

(21) Appl. No.: 18/192,275

(22) Filed: Mar. 29, 2023

(65) Prior Publication Data

US 2024/0204418 A1 Jun. 20, 2024

Related U.S. Application Data

(63) Continuation of application No. PCT/KR2023/003899, filed on Mar. 23, 2023.

(30) Foreign Application Priority Data

Dec. 20, 2022 (RU) ........................... RU2022133444

(51) Int. Cl.
*H01Q 21/06* (2006.01)
*H01Q 15/00* (2006.01)

(52) U.S. Cl.
CPC ....... *H01Q 21/065* (2013.01); *H01Q 15/0086* (2013.01)

(58) Field of Classification Search
CPC ......................... H01Q 21/065; H01Q 15/0086
See application file for complete search history.

(56) References Cited

U.S. PATENT DOCUMENTS 6,549,172 B1 4/2003 Thevenot et al.
8,681,064 B2 3/2014 Isom
(Continued)

FOREIGN PATENT DOCUMENTS

CN 109935964 A 6/2019
CN 210245710 U 4/2020
(Continued)

OTHER PUBLICATIONS

Russian Search Report dated Apr. 28, 2023, issued in Russian Application No. 2022133444/28.
(Continued)

*Primary Examiner* — David E Lotter
(74) *Attorney, Agent, or Firm* — Jefferson IP Law, LLP

(57) ABSTRACT

The disclosure relates to radio engineering, and more specifically, to a wide scan angle antenna array. Technical result consists in expanding the scanning range, increasing the efficiency of the antenna array and reducing losses. Antenna array is provided. The antenna array includes a plurality of antenna array elements, and a metasurface disposed above the antenna array, wherein the metasurface is a dielectric layer having, on a first side thereof, conductive elements configured to reflect part of radiation of the antenna array; the distance between the antenna array and the metasurface is based on an integer number of half wavelengths, an operating wavelength of the antenna array in a medium in the space between the antenna array and the metasurface, and a predetermined scanning angle of the antenna array.

12 Claims, 4 Drawing Sheets

(56) References Cited

U.S. PATENT DOCUMENTS

| | | | | |
|---|---|---|---|---|
| 10,135,133 | B2 * | 11/2018 | Wu | H01Q 1/523 |
| 2011/0163930 | A1 * | 7/2011 | De Lustrac | H01Q 15/0066 343/777 |
| 2015/0015449 | A1 | 1/2015 | Jecko et al. | |
| 2017/0179596 | A1 | 6/2017 | Diaz et al. | |
| 2020/0303832 | A1 * | 9/2020 | Xie | H01Q 3/46 |

FOREIGN PATENT DOCUMENTS

| | | | |
|---|---|---|---|
| CN | 112909578 | A | 6/2021 |
| CN | 113517558 | A | 10/2021 |
| CN | 114843771 | A | 8/2022 |
| CN | 115064877 | A | 9/2022 |
| RU | 2 473 157 | C1 | 1/2013 |

OTHER PUBLICATIONS

International Search Report dated Sep. 15, 2023, issued in International Application No. PCT/KR2023/003899.

Bilawal Khan et al., Design and experimental analysis of dual-band polarization converting metasurface for microwave applications, 2020 Scientific Reports, 2020.

Artem R. Vilenskiy et al., Wideband Beam Steering Antenna Array of Printed Cavity-Backed Elements With Integrated EBG Structure, IEEE Antennas and Wireless Propagation Letters, vol. 18, No. 2, Feb. 2019.

* cited by examiner

ANTENNA ARRAY WITH PARTIALLY REFLECTIVE DEPOLARIZING METASURFACE

CROSS-REFERENCE TO RELATED APPLICATION(S)

This application is a continuation application, claiming priority under § 365(c), of an International application No. PCT/KR2023/003899, filed on Mar. 23, 2023, which is based on claims the benefit of a Russian patent application number 2022133444, filed on Dec. 20, 2022, in the Russian Patent Office, the disclosure of which is incorporated by reference herein in its entirety.

TECHNICAL FIELD

The disclosure relates to radio engineering. More particularly, the disclosure relates to a wide scan angle antenna array.

BACKGROUND OF THE INVENTION

The ever-increasing needs of users motivate rapid development of communication technologies. Advanced fifth-generation (5G) and sixth-generation (6G) communication networks, which will feature higher performance characteristics such as high transmission rate and energy efficiency, are currently under active development.

New applications require a new class of radio systems capable of transmitting/receiving data/energy and able to adaptively change characteristics of radiated electromagnetic field. An important component of such systems is steerable antenna arrays, which find application in data transmission systems such as 5G (28 GHZ), WiGig (60 GHZ), Beyond 5G (60 GHZ), 6G (subTHz), long distance wireless power transmission systems long-distance wireless power transmission (LWPT) (24 GHZ), automotive radar systems (24 GHz, 79 GHZ), etc.

Basic requirements to mm-wave antenna arrays used in the above fields include low losses and high gain, ability of flexible steering of beam (direction of maximum radiation), i.e. beam scanning and focusing of radiated field in wide range of angles, operation in a wide frequency range, and compact, inexpensive, simple architecture suitable for mass production.

To date, printed circuit board (PCB) technique is widely used in designing mm-wave radiators, since this technique permits the production of devices simple in design and easy to manufacture, convenient to be integrated on a single substrate with other electronic components, and capable of achieving a wide band of operating frequencies.

A printed antenna array is an array of low-directivity printed circuit radiators.

Existing mm-wave antenna technologies have a number of limitations that significantly affect their applicability, such as, small distance between feed ports of antenna elements, propagation of surface waves in antenna PCBs, considerable falling of gain at great scan angles, need to adapt to Antenna-in-Package (AiP) technology, and extremely stringent requirements for manufacturing accuracy, quality of multilayer dielectric used, etc.

When used in communication systems, the basic requirements to an antenna array as part of a base station are full circular (360 degrees) scanning of beam in azimuth and work with double polarization. This scanning range is achieved by combining several antenna arrays with a limited scanning sector. The number of arrays required for the base station is typically determined by the scanning range of individual arrays used. Thus, if the scanning sector of the antenna array is limited to ±45 degrees, which is typical for antenna arrays currently used in base stations, then four arrays are required to provide full circular (360 degrees) beam scanning. With a scan sector extended to ±60 degrees, only three arrays are required for the antenna. As a result, increasing the scanning sector of a single antenna array can decrease the required number of antenna arrays to provide a specified scan angle and, accordingly, simplify the antenna array control.

One problem of existing dual-polarized antenna arrays is the coupling effect of feed ports of the antenna elements on each other (cross-polarization coupling between opposite polarized feed ports in one antenna element and in adjacent antenna elements, as well as co-polarization coupling between similarly polarized feed ports in adjacent antenna elements).

This effect is associated with propagation of parasitic surface waves between array elements in the PCB substrate and above its surface and leaky waves above the antenna array, their addition at the sites of feed elements, which causes mismatching of antenna elements or, in the case of dual-polarized arrays, power flow into second polarization ports.

Dual-polarized antenna elements have an asymmetric structure, which can worsen these effects. At the stage of designing antenna arrays, this also manifests itself in asymmetric radiation pattern of an individual antenna element in the entire array and resulting asymmetry in scanning characteristics.

This results in an unacceptable fall in the array element gain at a certain radiation angle relative to the normal, formation of an asymmetric radiation pattern of the individual antenna element and the entire array, and also in a narrower operating frequency range. Consequently, the gain unduly falls at wide scan angles (over 50 degrees). At the same time, it should be noted that when beam is deflected by an angle greater 45 degrees, the array gain falls significantly in one of two symmetrical scanning directions, precisely due to the asymmetry of radiation pattern of the individual antenna array element.

One approach to reduce coupling between antenna array elements is the use of electromagnetic band gap (EBG) elements (electromagnetic band gap is a structure with electromagnetic band gap, i.e. a structure that forms an area where electromagnetic waves of a certain frequency range cannot propagate), which block propagation of electromagnetic waves along their surface at required frequencies due to formation of band gap. By placing such EBG elements between elements of the antenna array, for example, on the perimeter of each element, the propagation of parasitic surface and leaky waves along the array surface can be blocked, which, in turn, will reduce coupling between array elements and bring radiation characteristics of the array closer to maximum analytical values. However, due to the lack of space between array elements, it is often not possible to arrange a sufficient number of rows of EBG elements necessary to completely block surface waves, and the use of EBG elements does not completely eliminate the above effects. Thus, additional measures are required to achieve required parameters of the antenna array.

To overcome the above problems, antenna array should observe the following criteria, high symmetry of antenna array elements, high orthogonality of electromagnetic fields excited in antenna array element, and no conditions for propagation of parasitic surface and leaky waves between antenna array elements.

Patent document CN 210245710 U discloses a stacked antenna comprising a radiation patch area isolation cavity surrounded by metal via holes, a support area isolation cavity surrounded by metal plates, and a feed area isolation cavity surrounded by metal via holes from top to bottom in sequence, the top of the isolation cavity of the radiation patch area is provided with a double-layer radiation patch, and the adjacent joint of the isolation cavity of the support area and the isolation cavity of the feed area is provided with a single-layer radiation patch, the feed area isolation cavity is internally provided with a coupling structure and a feed structure from top to bottom in sequence, the feeding structure is used for inducing an electromagnetic field into the coupling structure and carrying out coupling feeding on the double-layer radiating patch and the single-layer radiating patch. However, the solution requires the complex metal cavity between top and bottom patch PCB, which complicates the antenna element structure and assembly. Furthermore, this antenna element has an asymmetrical feed line structure, which can lead to an asymmetric antenna pattern.

Patent document U.S. Pat. No. 10,135,133 B2 discloses a device for improving radio frequency and microwave array antenna performance. The device sits in the near field, the reactive region, of the antenna array with a pattern of electrically isolated rectangular, cross shaped, ell, and/or similarly shaped patches of flat metal or other conductor in a single plane. The patches are segmented into smaller shapes no greater than 0.3 of a shortest wave length of the operating range of the antenna, and the height of the plane is greater than 0.25 and less than 0.4 of the center frequency's wavelength. Multiple electrically conductive patches are sized to diffract a portion of an electromagnetic wave from an underlying antenna element to a neighboring antenna element. The reflected radiation portion is added in opposite phase with radiation of the neighboring element of the antenna array, which leads to their mutual compensation and reduces the coupling between the array elements. However, this solution is strict about accuracy of location of reflective elements of the device above antenna array elements, which is a difficult task in the manufacture of equipment designed to operate in the 6G frequency range due to very small sizes of the elements. Furthermore, the device is not effective for dual-polarized arrays. It is also worth noting that this solution is applicable only to the antenna arrays that do not scan the beam.

Patent document U.S. Pat. No. 8,681,064 B2 discloses an antenna system for reducing coupling between antenna array elements, the antenna system comprising a transmit module configured to send a signal, a receive module configured to receive the signal, a radome, and a resistive frequency selective surface circuit configured to reduce a coupled portion of the signal that affects adjacent elements of the antenna array, the resistive frequency selective surface circuit being disposed in a path of the coupled portion of the signal. However, the solution can reduce coupling only between neighboring elements of the antenna array and is not designed to work with dual-polarized antenna arrays, which require additional significant suppression of coupling between orthogonal ports within a single radiator.

Thus, there is a need in the art for a simple and inexpensive steerable antenna structure which has wide scan angle, low loss, compact size, and high gain.

The above information is presented as background information only to assist with an understanding of the disclosure. No determination has been made, and no assertion is made, as to whether any of the above might be applicable as prior art with regard to the disclosure.

SUMMARY OF THE INVENTION

Aspects of the disclosure are to address at least the above-mentioned problems and/or disadvantages and to provide at least the advantages described below. Accordingly, aspect of the disclosure is to provide an antenna array with a partially reflective depolarizing metasurface.

Additional aspects will be set forth in part in the description which follows and, in part, will be apparent from the description, or may be learned by practice of the presented embodiments.

In accordance with an aspect of the disclosure, an antenna array is provided. The antenna array includes a plurality of antenna array elements, and a metasurface disposed above the antenna array so as to form a space therebetween, wherein the metasurface is dielectric layer having, on a first side thereof, conductive elements configured to reflect part of radiation of the antenna array, and wherein a distance between the antenna array and the metasurface is based on an integer number of half wavelengths, an operating wavelength of the antenna array in a medium in the space between the antenna array and the metasurface, and a predetermined scanning angle of the antenna array.

According to one embodiment of the antenna array, the conductive elements are arranged on the metasurface parallel to one side of the antenna array element.

According to another embodiment of the antenna array, the metasurface further comprises conductive elements configured to reflect part of radiation of the antenna array on a second side of the dielectric layer of the metasurface, and conductive elements on opposite sides of the dielectric layer are located orthogonally to each other and parallel to sides of the antenna array element.

According to another embodiment of the antenna array, the conductive elements have the form of multiple rectangular or oval elements, each having length $L_{CE}$ and width $W_{CE}$, where $L_{CE} \leq D_{array}$, $W_{CE} < L_{CE}/2$, $D_{array}$ is a linear size of the antenna array element, and the conductive elements are arranged in rows spaced apart at a distance $D_{CE} \leq D_{array}$, while the distance between conductive elements in one row does not exceed $\lambda/2$.

According to another embodiment of the antenna array, the space between the antenna array and the metasurface is filled with air, and $\lambda$ is an operating wavelength of the antenna array in a free space.

According to another embodiment of the antenna array, the space between the antenna array and the metasurface is filled with a dielectric, and thickness of the dielectric layer is $h \approx 0.5\lambda_\varepsilon(1+n)/\cos(\theta_s)$, where $\lambda_\varepsilon$ is a wavelength in the dielectric layer between the metasurface and the antenna array.

According to another embodiment of the antenna array, thickness of the metasurface is $h_M \approx (0.25\lambda_M + n^*\lambda_M/2)/\cos(\theta_s)$, where $\lambda_M$ is a wavelength in the dielectric layer of the metasurface, n is an integer number of half wavelengths.

According to another embodiment of the antenna array, the conductive elements on the metasurface have the form of continuous straight conductive elements.

According to another embodiment of the antenna array, the metasurface is implemented on a multilayer printed circuit board consisting of dielectric layers with different thickness and dielectric permittivity.

According to another embodiment of the antenna array, the antenna array is a dual-polarized antenna array.

The disclosure provides a steerable antenna array with simple architecture, high efficiency, low losses, compact size, high gain, capable of focusing/scanning the beam in a wide range of volumetric scanning angles, and working in a wide frequency range.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
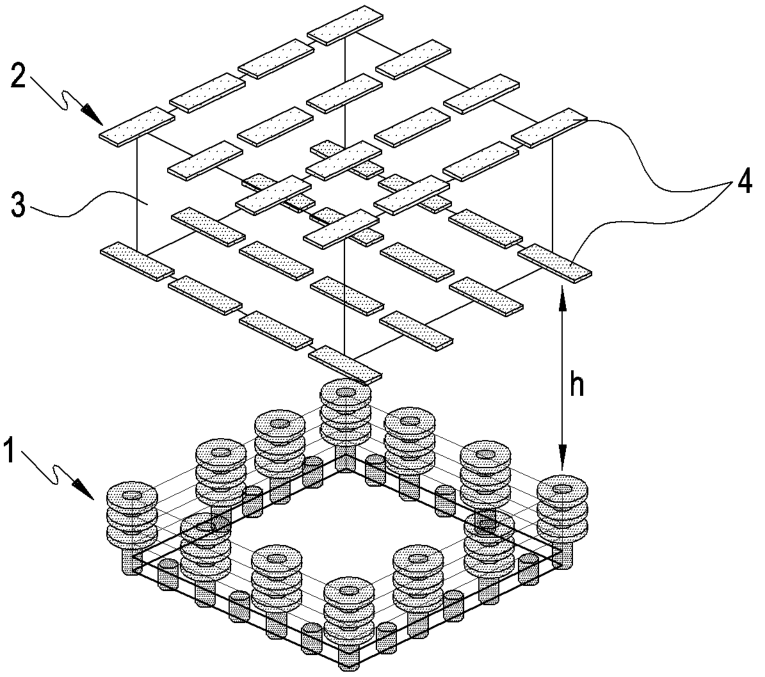
FIG. 1 is a general view of an antenna array element according to an embodiment of the disclosure.

FIG. 1 is a general view of an antenna array element according to an embodiment of the disclosure.

Figure 2:
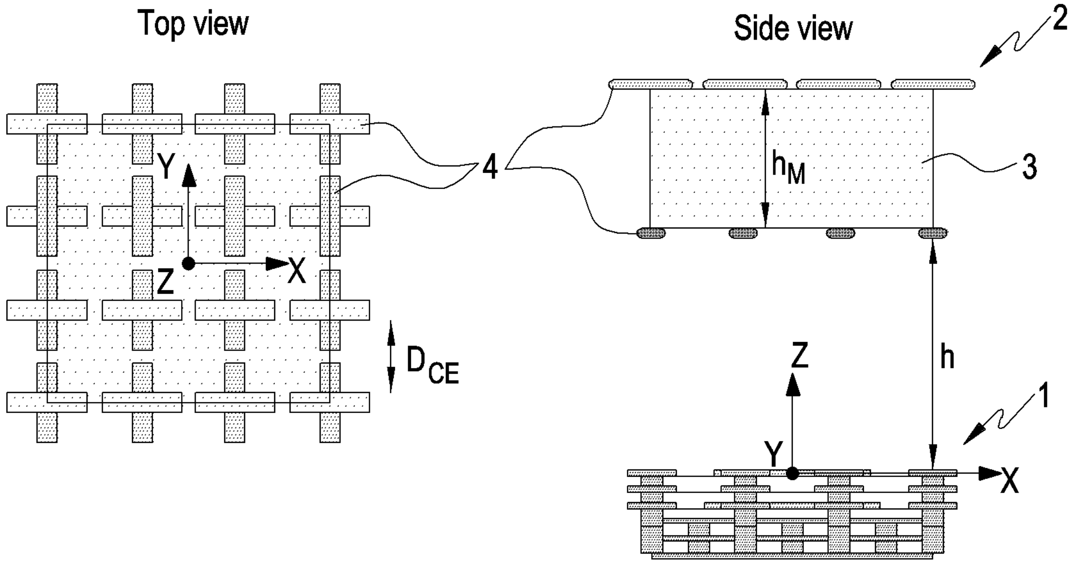
FIG. 2 depicts a top view and a side view of an antenna array element according to an embodiment of the disclosure.

FIG. 2 depicts a top view and a side view of an antenna array element according to an embodiment of the disclosure.

Referring to FIGS. 1 and 2, in accordance with an embodiment, the disclosure provides a dual-polarized antenna array comprising a plurality of antenna array elements 1 (see FIGS. 1 and 2), with a depolarizing partially reflective metasurface 2 placed above the antenna array, the metasurface being a dielectric layer 3 which has, on opposite sides thereof, conductive elements 4 arranged orthogonally to each other and configured to reflect part of radiation of the antenna array, distance h between the antenna array and the metasurface is $h>0.4\lambda$, where $\lambda$ is an operating wavelength of the antenna array in a medium in the space between the antenna array and the metasurface. In the case where the space is filled with air, $\lambda$ is an operating wavelength of the antenna array in a free space. "Depolarizing partially reflective metasurface" herein refers to a periodic structure that partially reflects excited electromagnetic field of operating polarization (co-polarization), which, as a result of interaction with this structure, is converted (depolarized) into an electromagnetic field of orthogonal polarization (cross-polarization).

Figure 3:
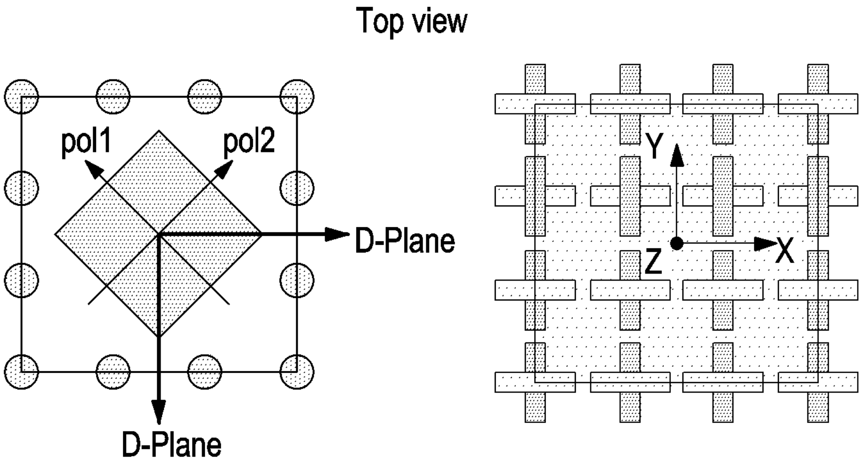
FIG. 3 is a top view of one antenna array element (left) and metasurface (right), with indication of scanning planes according to an embodiment of the disclosure.

FIG. 3 is a top view of one antenna array element (left) and metasurface (right), with indication of scanning planes according to an embodiment of the disclosure.

Referring to FIG. 3, conductive elements 4 are located on both sides of the dielectric layer 3. Moreover, the conductive elements 4 on opposite sides of the dielectric layer 3 are placed orthogonally to each other and parallel to sides of the antenna array element 1. In antenna arrays scanning in D-planes, said conductive elements are thus rotated 45 degrees with respect to the polarization vectors (see FIG. 3).

The thickness $h_M$ of the metasurface dielectric layer 3 is chosen to reduce coupling particularly at antenna array scanning angles $\theta_s$, where radiation characteristics degrade (antenna gain falls) due to in-phase summation of surface waves (for example, at angles of ±50° . . . 60°, where the situation worsens due to appearance of a diffraction lobe during scanning), which exhibit the aforementioned negative effects typical to conventional solutions:

$h \approx 0.25\lambda_M/\cos(\theta_s)$ or, in the general case, $h_M \approx (0.25\lambda_M + n*\lambda_M/2)/\cos(\theta_s)$, where $\lambda_M$ is a wavelength in the metasurface dielectric layer, n is an integer number of half wavelengths, and $\theta_s$ is a predetermined scanning angle of the antenna array, for which falling the gain of the antenna array is to be compensated.

In the embodiment shown in FIGS. 1 and 2, the conductive elements 4 comprise a plurality of rectangular elements, each having length $L_{CE}$ and width $W_{CE}$, where $L_{CE} \leq D_{array}$, $W_{CE} < L_{CE}/2$, $D_{array}$ is a linear size of the antenna array element.

Furthermore, rectangular conductive elements 4 are arranged in rows spaced apart at a distance $D_{CE} \leq D_{array}$. Maximum distance between conductive elements 4 in one row does not exceed $\lambda/2$.

In an embodiment, the antenna array scans in D-plane. This means that the conductive elements on the metasurface are located at an angle of 45 degrees to operating polarizations (pol1, pol2) of the antenna array (see FIG. 3).

The antenna element generally has different radiation pattern shapes of the in E- and H-planes, i.e. arranging the element without rotation gives different radiation patterns for each antenna port in a common plane. In D-plane (see FIG. 3) radiation patterns of different ports, for this case, are identical in the X and Y scan planes and are close to identical in the case of small power leakage between the ports over the entire scan range. As a result, when designing an antenna element and an array, it is sufficient to optimize its geometry in one plane (in the second plane, the simulation results will be the same due to the identity of radiation characteristics in D-plane). This also simplifies control of the array, since it will be possible to apply the same phase distribution to the array elements for scanning in both polarizations.

Hereinafter, operating principle of the metasurface according to the disclosure will be described with reference to FIG. 4.

Figure 4:
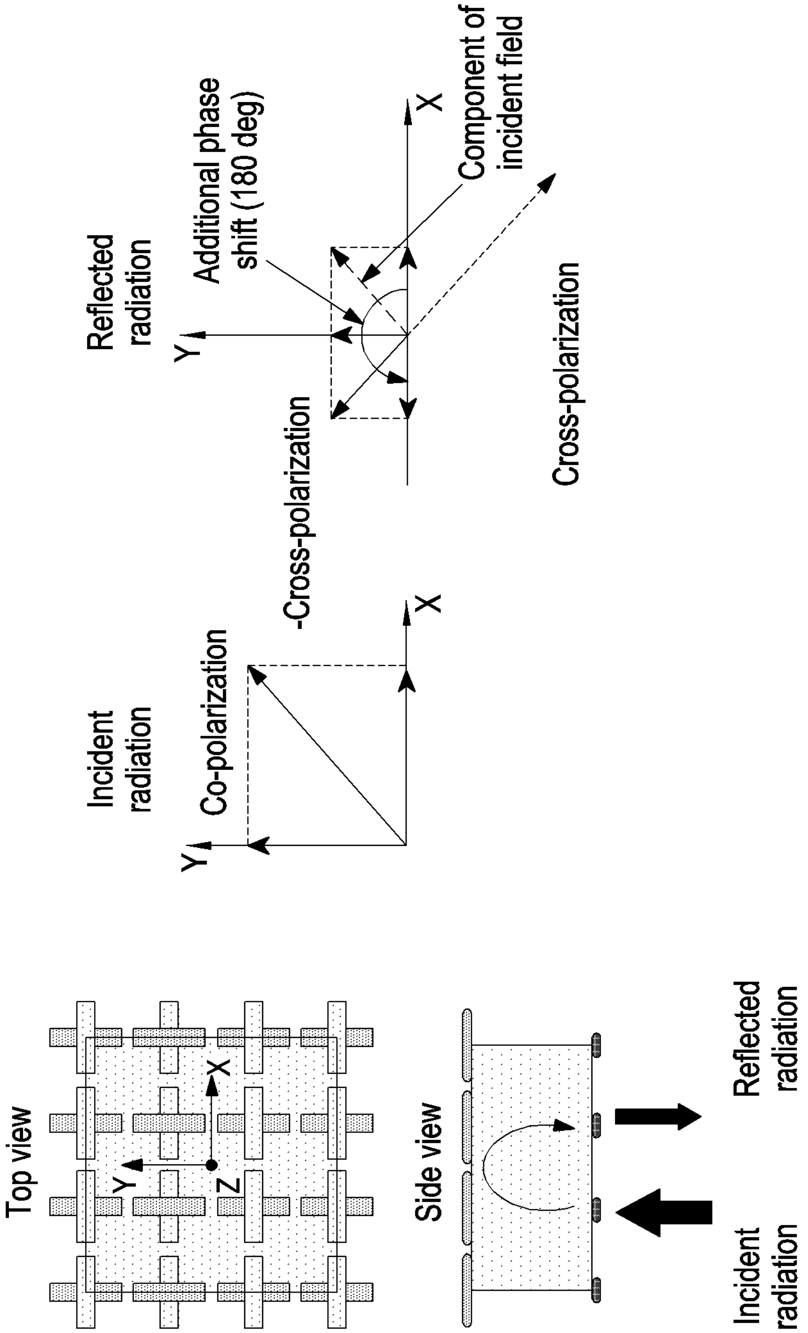
FIG. 4 is a schematic view of principle of operation of a metasurface according to an embodiment of the disclosure.

FIG. 4 is a schematic view of a principle of operation of a metasurface according to an embodiment of the disclosure.

Referring to FIG. 4, a signal goes from RF (radio frequency) port to dual-polarized antenna array element 1. The antenna array element 1 radiates an electromagnetic wave of corresponding linear polarization. This radiation has a co-polarization (main) component and a cross-polarization (parasitic) component.

Part of the radiated power from the antenna array element 1 (excited operating polarization), incident on metasurface 2, reflects from the metasurface (see FIG. 4) as follows:

A Y-component of the incident radiation is reflected from conductive elements 4 located along the Y axis (on the lower surface of the metasurface). Since the size of these conductive elements 4 along the X axis is much smaller than along the Y axis, the X-component of the incident radiation is reflected only to a very small extent, and the largest portion of the incident radiation penetrates into dielectric layer 3 of the metasurface 2.

An X-component of the radiation, propagating to the upper boundary of the metasurface 2, is then reflected from the conductive elements 4 located along the X axis at the upper boundary of the metasurface.

Since the thickness of the metasurface 2 is $h_M \approx 0.25\lambda_M/\cos(\theta_s)$, the reflected X-component at the antenna array scanning angle $\theta_s$ gets a phase shift of 180° with respect to the incident radiation. As a result, the X-component vector on the lower boundary of the metasurface changes its direction to the opposite after passing through the dielectric layer twice, while the reflected Y-component vector on the lower boundary of the metasurface, getting no additional phase shift, does not change its direction. FIG. 4 (right side) shows conversion of the resulting polarization. Therefore, upon reflection from the metasurface, part of the incident radiation is converted into antiphase radiation with cross-polarization.

The above formula for $h_M$ is approximate. The actual thickness of the metasurface dielectric may differ by approximately ±20% due to a decrease, according to the law of refraction, of the incident radiation angle $\theta_s$. Also, the optimal thickness value will be influenced by coupling between the conductive elements.

Furthermore, the metasurface 2 is located at distance $h>0.4\lambda$ from the antenna array ($\lambda$ is an operating wavelength in the medium in the space between the antenna array and the metasurface), i.e. above the reactive field area, in the area where electromagnetic field has already been established. This eliminates appearance of undesirable results of impact of reactive fields on the metasurface.

The space between the antenna array and the metasurface may be provided using dielectric spacers. In an embodiment of the disclosure, the space is filled with air.

When the cross-polarized reflected radiation propagates from the metasurface 2 towards the antenna array, a parasitic cross-polarization component excited in the antenna array is compensated for by reflected cross-polarization component because of their antiphase interaction. The distance (space size) between the antenna array and the metasurface, which supports such antiphase interference, is $h \approx 0.5\lambda/\cos(\theta_s)$ or, in the general case, $h \approx 0.5\lambda(1+n)/\cos(\theta_s)$, where n is an integer number of half wavelengths (n=0, 1, 2 . . . ). Slight deviations from $0.5\lambda(1+n)/\cos(\theta_s)$ are associated with the operating frequency range (and possibly the specific frequency at which the gain is falling), as well as with the coupling of the metasurface with the elements of the antenna array. Also, deviations from said value can be associated with the presence of EBG elements in the antenna array configuration, which change electromagnetic coupling with the metasurface.

The described interaction of parasitic cross-polarization component of the antenna array radiation with reflected cross-polarization radiation makes it possible to reduce cross-polarization component of the antenna array radiation. As a result, the antenna array gain increases at wide scanning angles.

In the range of about ±20° from $\theta_s$, a similar effect of improving the antenna array characteristics (gain) will be observed as a result of decreasing the depolarization effect, but at a greater deviation from $\theta_s$, a slight fall in gain is possible (for example, at $\theta_s=0$) due to a mismatch in the array opening when the metasurface is embedded. However, the expansion of the scanning sector at a given array gain is often more important for the entire system.

In addition, the metasurface 2 according to an embodiment of the disclosure has a uniform configuration, which leads to decreasing the sensitivity to its longitudinal displacements relative to centers of antenna array elements 1, which simplifies assembly of the structure and reduces cost of the antenna array as a whole and can provide a more reliable design of the antenna array, while having high efficiency.

The arrangement of conductive elements 4 orthogonally to each other on both sides of the metasurface can ensure a high efficiency for dual-polarized antenna arrays.

The disclosure can reduce both coupling between adjacent antenna array elements and coupling between ports of different polarizations within one element of a dual-polarized antenna array.

It is worth noting that the above embodiment can be similarly implemented with a single-polarized antenna array to achieve similar effects. In a single-polarized antenna array, part of the radiation power can be transferred to the cross-polarization component of the field, and then the described effect of suppressing the cross-polarization radiation will improve the efficiency of the antenna array.

By varying density, length and width of conductive elements on the metasurface, the level of electromagnetic radiation reflected or passed through the metasurface, i.e. its radio transparency, can be adjusted. Thus, optimal value of the amplitude and phase of the reflected signal can be obtained.

At a certain relationship of parameters of metasurface elements, the effect of balance of reflected and radiated power will be observed. In practice of the disclosure, it is necessary to ensure that the reflected power is sufficient to suppress the parasitic cross-polarization component at a sufficient level of transmitted (radiated) power. As a result, this is expressed in obtaining the maximum gain of the antenna array in a given direction.

According to another embodiment of the disclosure, conductive elements on the metasurface are oval, with length $L_{CE}$ and width $W_{CE}$ of the conductive elements also observing the conditions:

$L_{CE} \leq D_{array}$, $W_{CE} < L_{CE}/2$.

This shape of conductive elements can be provided by a higher precision etching on a printed circuit board.

According to another embodiment of the disclosure, the conductive elements on the metasurface have the form of continuous straight conductive elements. This embodiment is easier to manufacture. In this case, conductive elements may be of minimum technologically feasible width. However, in this embodiment, the reflected signal amplitude and phase do not always give optimal values for compensating for parasitic cross-polarization.

According to another embodiment of the disclosure, conductive elements are placed only on one side of the metasurface, and size of the elements and distance between them do not fundamentally differ from the double-sided design. This embodiment is easier to manufacture. Preferably, conductive elements are placed on the side of the metasurface closest to the antenna array. This embodiment is more efficient than the embodiment of arranging conductive elements on the opposite side. All other features of this embodiment are the same as those of the above embodiment and are not described again. However, in this case, the metasurface will affect only one component of the incident radiation, which reduces its effectiveness for a dual-polarized antenna array.

Figure 5:
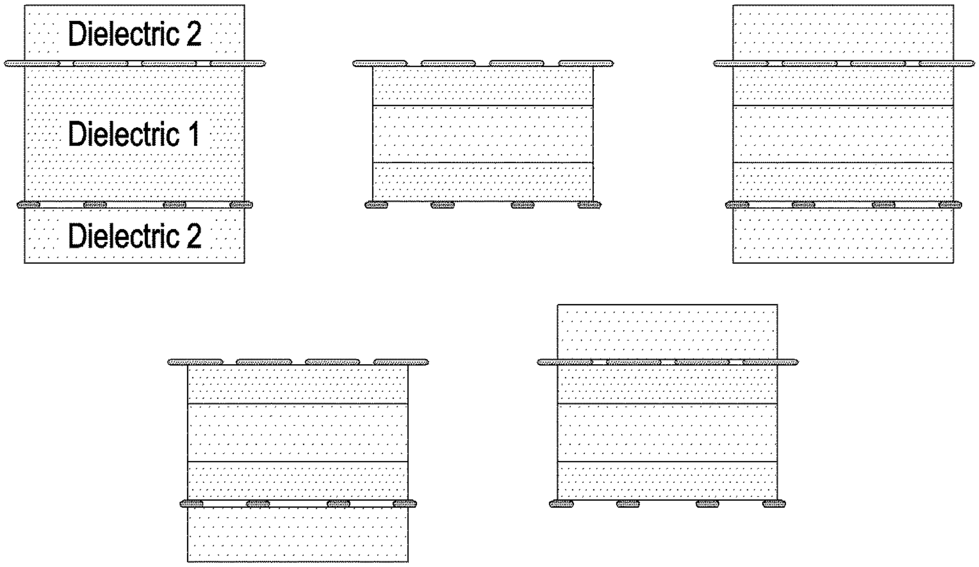
FIG. 5 depicts possible alternative embodiments of a metasurface on a multilayer printed circuit board according to an embodiment of the disclosure.

FIG. 5 depicts possible alternative embodiments of a metasurface on a multilayer printed circuit board according to an embodiment of the disclosure.

Referring to FIG. 5, the metasurface can be implemented on a multilayer printed circuit board consisting of dielectric layers with different thickness and dielectric permittivity. FIG. 5 illustrates various options for implementing the metasurface. The particular structure of the metasurface is chosen based on process, economic and other conditions. In this case, the main requirement for the metasurface is the formation of required phase shift (180°) for one component of incident radiation at a given scanning angle of the antenna array during its conversion. The ability of implementing such metasurface increases flexibility of antenna array design with account of available printed circuit boards and manufacturing capabilities.

Values of dielectric permittivity and thickness of used metasurface dielectric layers can be chosen to provide required radio transparency.

Depending on the design and process requirements, the metasurface can be of the same size as the antenna array, or it can be larger than the antenna array, i.e. the metasurface size may exceed that of the antenna array.

According to another embodiment of the disclosure, the space between the metasurface and the antenna array may be filled with a dielectric. In this case, thickness of the dielectric layer is determined in accordance with the equation:

$h \approx 0.5\lambda_{\varepsilon}(1+n)/\cos(\theta_s)$, where $\lambda_{\varepsilon}$ is a wavelength in the dielectric layer between the metasurface and the antenna array, n=0, 1, 2 . . . .

The dielectric layer in this embodiment can also act as a dielectric spacer.

In addition, the metasurface can carry an additional functional load as a protective layer (radome).

Figure 6:
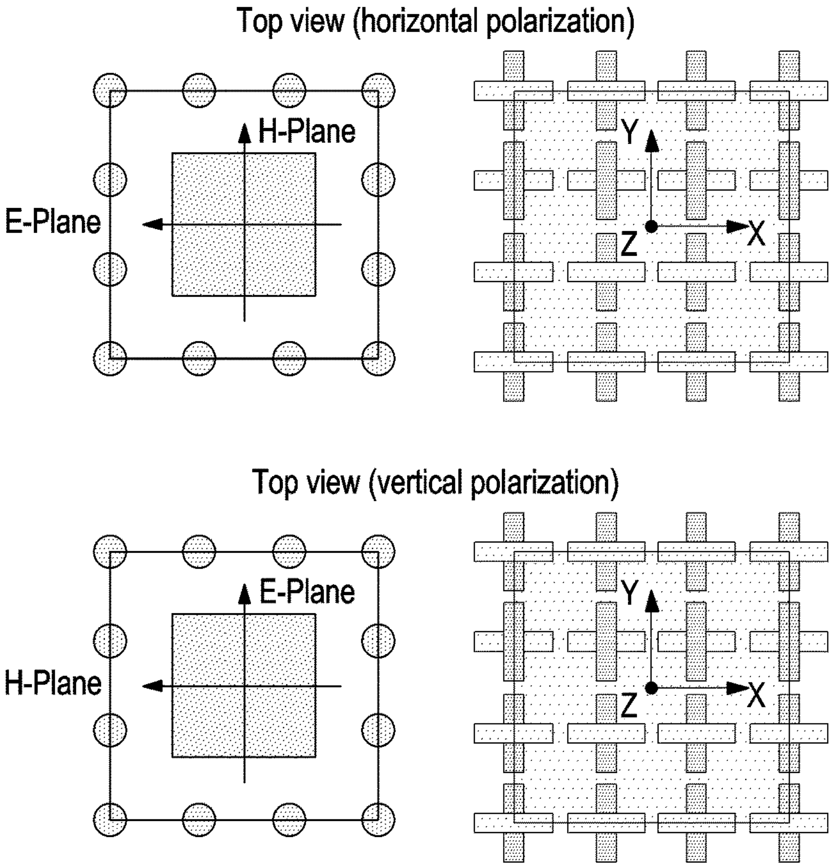
FIG. 6 depicts a top view of one antenna array element (left) and a metasurface (right), with indication of scanning planes for different polarizations according to an embodiment of the disclosure.

FIG. 6 depicts a top view of one antenna array element (left) and a metasurface (right), with indication of scanning planes for different polarizations according to an embodiment of the disclosure.

Referring to FIG. 6, the antenna array scans separately in E and H planes (see FIG. 6) for each polarization. For a typical case of scanning in E and H planes of an antenna array element, the disclosure will be effective to solve the blindness problem of dual-polarized antenna array. This option is implemented by rotating patches and their exciting elements by ±45 degrees around the Z axis. Thus, scanning in E plane for a first polarization will be scanning in H plane for a second polarization and vice versa.

Therefore, the disclosure expands the scanning range and operating frequency band of the antenna array, improves its performance and reduces losses. At the same time, the antenna array according to the disclosure is compact and has simple and cost effective architecture applicable for mass production.

The antenna array according to the disclosure has antenna-in-package (AiP) compatible design.

The inventive antenna array is intended to be used in the mm-wave range. However, any wavelength ranges in which radiation and controlled directivity of electromagnetic waves are possible can be used alternatively. For example, shortwave, sub-millimeter (terahertz) radiation, etc. can be used as an alternative.

Compact and high performance steerable antenna array systems according to the disclosure may find application in emerging 5G, 6G and WiGig wireless communication systems. Furthermore, embodiments of the present disclosure can be used in both base stations and antennas of mobile terminals. User terminal antennas are steered to point the main lobe of the radiation pattern to the position of the base station antenna.

The disclosure is applicable in all types of LWPT systems: outdoor/indoor, automotive, mobile, etc. It ensures high power transmission efficiency in all scenarios owing to low insertion loss of the metasurface. A power transmission device can be constructed on the basis of the disclosed antenna array structure and thus can implement beam focusing while charging devices in the near field or beam scanning to transmit power to the devices located in the far field of the transmitter antenna.

In robotics, the present antenna can be used to detect/avoid obstacles.

The disclosure is also applicable in autonomous vehicle radars.

It should be understood that although the terms such as "first", "second", "third" and the like may be used herein to describe various elements, components, regions, layers and/or sections, these elements, components, regions, layers and/or sections should not be limited by these terms. These terms are only used to distinguish one element, component, region, layer, or section from another element, component, region, layer, or section. Thus, a first element, component, region, layer, or section may be referred to as a second element, component, region, layer, or section without departing from the scope of the disclosure. As used herein, the term "and/or" includes any and all combinations of one or more of the respective listed items. Elements mentioned in the singular do not exclude the plurality thereof, unless otherwise specified.

Functionality of an element specified in the description or claims as a single element may be practiced by means of several components of the device, and conversely, functionality of elements specified in the description or claims as several separate elements may be practiced by means of a single component.

Embodiments of the disclosure are not limited to the embodiments described herein. Other embodiments of the disclosure that do not go beyond the idea and scope of this disclosure will be apparent to those skilled in the art on the basis of the information set forth in the description and knowledge of technology.

Elements mentioned in the singular do not exclude the plurality of elements, unless otherwise specified.

Those skilled in the art should appreciate that the essence of the disclosure is not limited to a particular software or hardware, and therefore any existing software and hardware can be used for implementing the disclosure. For example, hardware may be implemented in one or more ASICs, digital signal processors, digital signal processing devices, programmable logic devices, field-programmable gate arrays, processors, controllers, microcontrollers, microprocessors, electronic devices, other electronic units configured to perform the functions described in this disclosure, a computer or a combination thereof.

It is apparent that storage of data, programs, etc. implies presence of a computer-readable storage medium. Examples of computer-readable storage media include read only memory, random access memory, register, cache memory, semiconductor storage devices, magnetic media such as internal hard drives and removable drives, magneto-optical media, and optical media such as CD-ROMs and digital versatile discs (DVDs), as well as any other media known in the art.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An antenna array comprising:

a plurality of antenna array elements; and a metasurface disposed above the antenna array elements so as to form a space between the antenna array elements and the metasurface, wherein the metasurface is a dielectric layer having, on a first side of the metasurface, conductive elements configured to reflect part of radiation of the antenna array, and wherein a distance between the antenna array elements and the metasurface is determined based on an integer number of half wavelengths, an operating wavelength of the antenna array in a medium in the space between the antenna array elements and the metasurface, and a predetermined scanning angle of the antenna array.

2. The antenna array of claim 1, wherein the distance between the antenna array elements and the metasurface is $h \approx 0.5\lambda(1+n)/\cos(\theta_s)$, where n is the integer number of half wavelengths (n=1, 2, 3, . . . ), $\lambda$ is the operating wavelength of the antenna array, and $\theta_s$ is the predetermined scanning angle of the antenna array.

3. The antenna array of claim 1, wherein the conductive elements are arranged on the metasurface parallel to one side of the antenna array elements.

4. The antenna array of claim 1, wherein the metasurface further comprises conductive elements, configured to reflect part of radiation of the antenna array, on a second side of the metasurface dielectric layer, and wherein conductive elements on opposite sides of the dielectric layer are located orthogonally to each other and parallel to sides of the antenna array elements.

5. The antenna array of claim 1, wherein the conductive elements have the form of multiple rectangular or oval elements, each having length $L_{CE}$ and width $W_{CE}$, where $L_{CE} \leq D_{array}$, $W_{CE} < L_{CE}/2$ $D_{array}$ is a linear size of the antenna array elements, and wherein the conductive elements are arranged in rows spaced apart at a distance $D_{CE} \leq D_{array}$, while the distance between conductive elements in one row does not exceed a half of the operating wavelength of the antenna array.

6. The antenna array of claim 1, wherein the space between the antenna array elements and the metasurface is filled with air, and wherein the operating wavelength of the antenna array is in a free space.

7. The antenna array of claim 1, wherein the space between the antenna array elements and the metasurface is filled with a dielectric, and wherein a thickness of the dielectric layer is $h \approx 0.5\lambda_\varepsilon(1+n)/\cos(\theta_s)$, where n is the integer number of half wavelengths (n=1, 2, 3, . . . ), $\lambda_\varepsilon$ is a wavelength in the dielectric layer between the metasurface and the antenna array elements, and $\theta_s$ is the predetermined scanning angle of the antenna array.

8. The antenna array of claim 1, wherein a thickness of the metasurface is $h_M \approx (0.25\lambda_M + n^*\lambda_M/2)/\cos(\theta_s)$, where n is the integer number of half wavelengths (n=1, 2, 3, . . . ), $\lambda_M$ is a wavelength in the metasurface dielectric layer, and $\theta_s$ is the predetermined scanning angle of the antenna array.

9. The antenna array of claim 1, wherein the conductive elements on the metasurface have the form of continuous straight conductive elements.

10. The antenna array of claim 1, wherein the metasurface is implemented on a multilayer printed circuit board consisting of dielectric layers with different thickness and dielectric permittivity.

11. The antenna array of claim 1, wherein the antenna array is a dual-polarized antenna array.

12. The antenna array of claim 1, wherein the conductive elements are placed on only one side of the metasurface.

* * * * *